United States Patent [19]
Oosaki

[11] Patent Number: 5,980,233
[45] Date of Patent: Nov. 9, 1999

[54] IN-MOLD LABEL APPLYING DEVICE

[75] Inventor: Masayuki Oosaki, Tochigi, Japan

[73] Assignee: Kao Corporation, Tokyo, Japan

[21] Appl. No.: 08/973,405

[22] PCT Filed: Feb. 28, 1997

[86] PCT No.: PCT/JP97/00624

§ 371 Date: Dec. 15, 1997

§ 102(e) Date: Dec. 15, 1997

[87] PCT Pub. No.: WO97/38846

PCT Pub. Date: Oct. 23, 1997

[30]    Foreign Application Priority Data

Apr. 16, 1996  [JP]  Japan .................................. 8-093838

[51] Int. Cl.⁶ .......................... B29C 33/14; B29C 49/24
[52] U.S. Cl. ................... 425/503; 264/509; 425/126.1; 425/522
[58] Field of Search .................. 425/522, 503, 425/504, 126.1; 264/509

[56]    References Cited

U.S. PATENT DOCUMENTS

| | | | |
|---|---|---|---|
| 3,292,209 | 12/1966 | Borkmann | 425/522 |
| 4,549,863 | 10/1985 | Bourgeois | 425/503 |
| 4,802,832 | 2/1989 | Shapler | 425/503 |
| 4,983,348 | 1/1991 | Barresi et al. | 425/503 |
| 5,026,266 | 6/1991 | Takasaki et al. | 425/503 |
| 5,169,653 | 12/1992 | Tate et al. | 425/503 |
| 5,192,554 | 3/1993 | Savich | 425/522 |
| 5,350,483 | 9/1994 | Yager et al. | 156/571 |

FOREIGN PATENT DOCUMENTS

| | | |
|---|---|---|
| 0 377 735 | 7/1990 | European Pat. Off. . |
| 64-61223 | 3/1989 | Japan ................ 425/503 |
| 64-84832 | 3/1989 | Japan . |
| WO 92/11124 | 7/1992 | WIPO . |

*Primary Examiner*—Robert Davis
*Attorney, Agent, or Firm*—Oblon, Spivak, McClelland, Maier & Neustadt, P.C.

[57]    ABSTRACT

An in-mold label applying device for applying a label to an interior of a metal mold for blow molding includes an entering arm composed of a first link portion having a changeable configuration, an applying arm composed of a second link portion having a changeable configuration and also having a shaft in common with the entering arm on a distal end thereof, and a label fitting portion provided on a distal end of the applying arm. When the entering arm advances toward the metal mold while changing in configuration, the applying arm also changes in configuration and is operatively associated with the changing configuration of the entering arm. When the configuration of the applying arm changes, the applying arm causes the label fitting portion to move to a prescribed position within the metal mold.

4 Claims, 7 Drawing Sheets

IN-MOLD LABEL APPLYING DEVICE

BACKGROUND OF THE INVENTION

1. Field of the Invention

This invention relates to an in-mold label applying device and more particularly to one capable of shortening a molding cycle time and improving accuracy of application of a label.

2. Description of the Related

The so-called in-mold labeling is practiced in which, when a blow molded container is manufactured by blow molding, mold halves are closed for blow molding after a label is applied (temporary deposition) to an inner surface of each container, so that the label is integrally attached to the surface of the hollow molded container.

The above-mentioned application of a label to an inner surface of each mold half is automatically carried out by an in-mold label applying device. Heretofore, the in-mold label applying device was actuated using two drive sources, namely, an air cylinder or motor for bringing the label into a space between mold halves which are in an open position, and an air cylinder or motor for transferring the label brought into the space between the mold halves to an inner surface of one of the mold halves.

However, this conventional device had problems such that, since there is a need of a provision of two drive sources corresponding to two axial directions perpendicular to each other, manufacturing costs are increased and the mechanism is complex, thus resulting in failure. Moreover, because the second operation must be performed after making sure that the first operation is finished, a time loss occurs for such sure performance. A further problem was also encountered in that, since the drive mechanism must be mounted on an arm portion for applying a label, the arm portion is increased in weight which makes it difficult for the arm portion to follow a high-speed operation.

As one for improving the above problems, U.S. Pat. No. 4,549,863 discloses an in-mold label applying device in which a label is brought into a space between mold halves which are in an open position and attached to the inner walls of the mold halves by a single drive mechanism. A representative one out of a plurality of in-mold label applying devices described in U.S. Pat. No. 4,549,863 is shown in FIG. 7.

Figure 7:
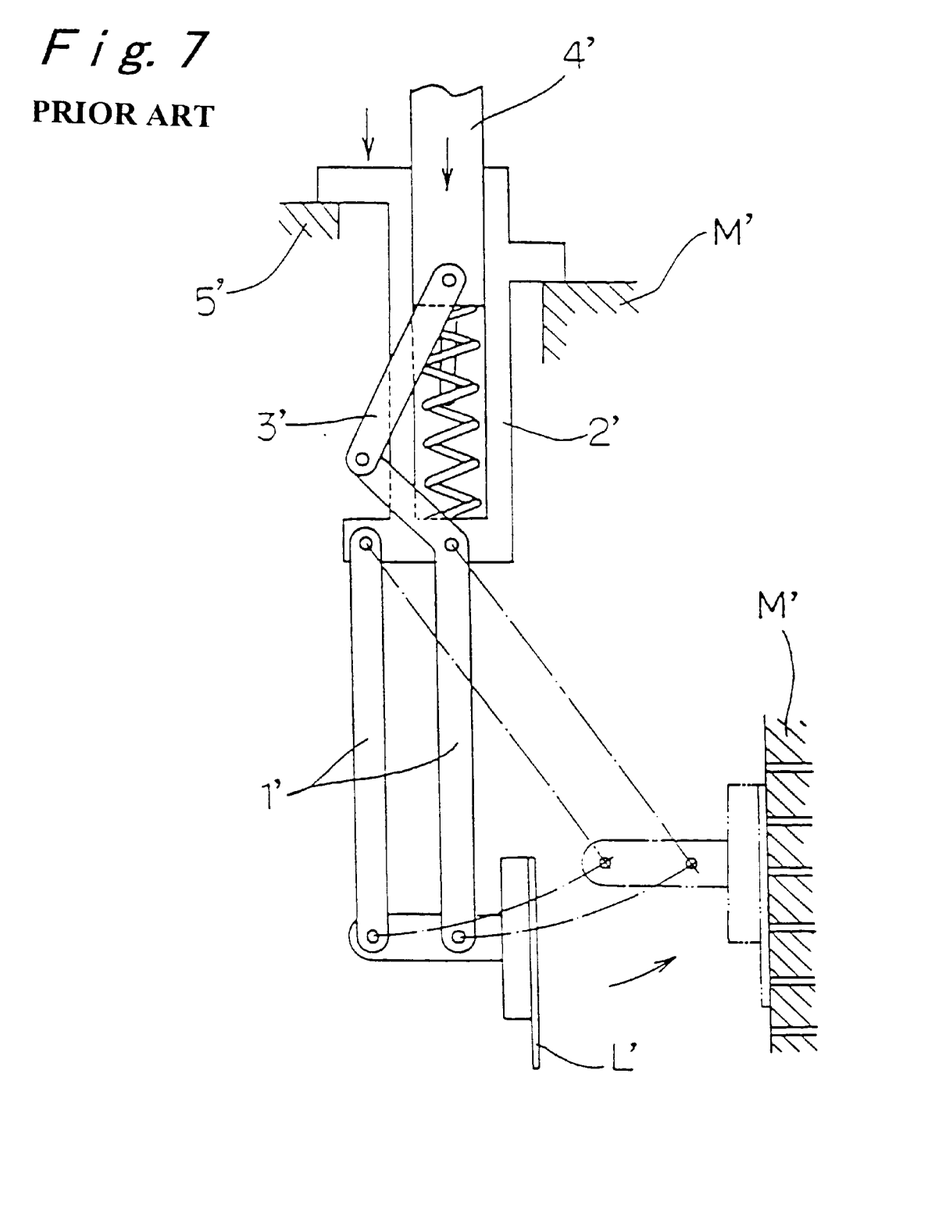
FIG. 7 is a side view showing a conventional in-mold label applying device.

In the prior art in-mold label applying device shown in FIG. 7, when main arm 1' for depositing a label L' comes into the space between an opened metal mold M' a prescribed distance, a case portion 2'contacts the metal mold M' and a stopper 5'. Then, a piston 4', a sub-arm 3'and the main arms 1'are cooperated to apply the label L' attached to the distal ends of the main arms 1'to the inner surface of the metal mold M' in a way as indicated by broken lines of FIG. 7.

With the use of the in-mold label applying device of FIG. 7, however, application accuracy of the label L' is degraded because the orbit of the label L' exhibits a circular arc when the label L' is deposited on the inner surface of the metal mold M'. In addition, it gives rise to another problem in that damage is liable to occur due to rubbing of the label L'. Moreover, there is a further problem in that, when the configuration of a hollow container to be molded is changed, the configurations of the arms 1'and 3'must also be changed taking into account among others, an angle of contact of the label L' with the inner surface of the metal mold M'.

SUMMARY OF THE INVENTION

It is, therefore, an object of the present invention to provide an in-mold label applying device in which a molding cycle time can be reduced and application accuracy of a label can be enhanced.

Figure 2:
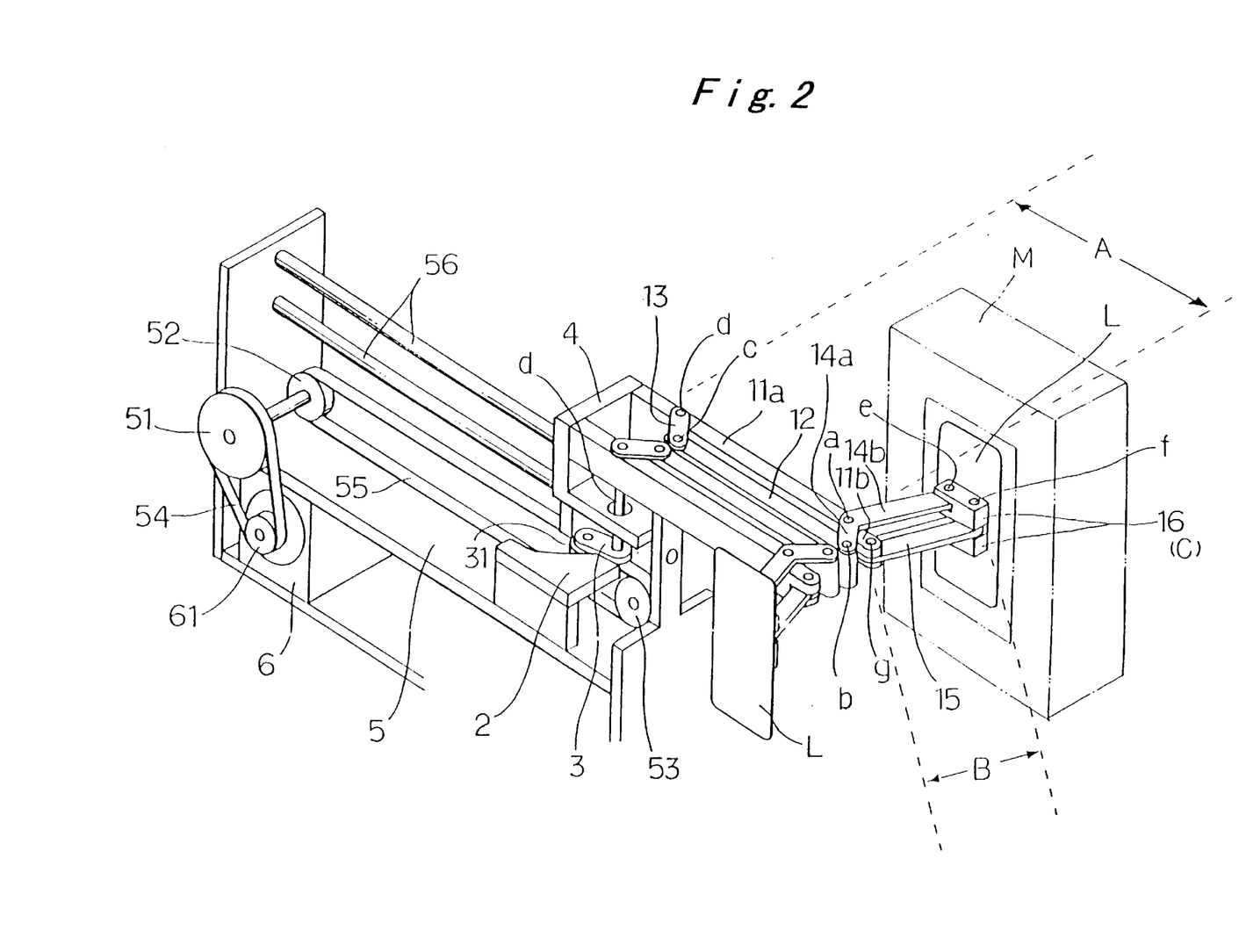
FIG. 2 is a perspective view of one embodiment of an in-mold label applying device according to the present invention, showing one state of the entering arms after entry.

The invention as shown in FIG. 2 has achieved the above object by providing an in-mold label applying device for applying a label L to the interior of a metal mold M for blow molding, comprising an entering arm A composed of a first link portion formed in a variable configuration, an applying arm B composed of a second link portion formed in a variable configuration and having a shaft a in common with the entering arm A on a distal end thereof, and a label fitting portion C provided on a distal end of the applying arm B, wherein when the entering arm A advances toward the metal mold M while varying in configuration, the applying arm B varies in configuration and is operatively associated with the configurational variation of the entering arm A. Because the configuration of the applying arm B varies, the applying arm B causes the label fitting portion C to move to a prescribed position within the metal mold M.

The invention as defined in FIG. 2 has achieved the above object by providing an in-mold label applying device, further comprising a cam plate portion 2 arranged by the side of the entering arm A, and a cam abutting portion 3 joined to the entering arm A through a cam shaft d in such a manner as to have a constant angle with one side piece 13 of the entering arm A, the entering arm A effecting, while varying in configuration, an entry due to contact between the cam plate 2 and the cam abutting portion 3.

The invention has achieved the above object by providing an in-mold label applying device, wherein a cam profile of the cam plate 2 is designed such that the label fitting portion C is moved in a direction perpendicular to the advance direction of the entering arm A through the applying arm B.

DETAILED DESCRIPTION OF THE PREFERRED EMBODIMENT

Figure 1:
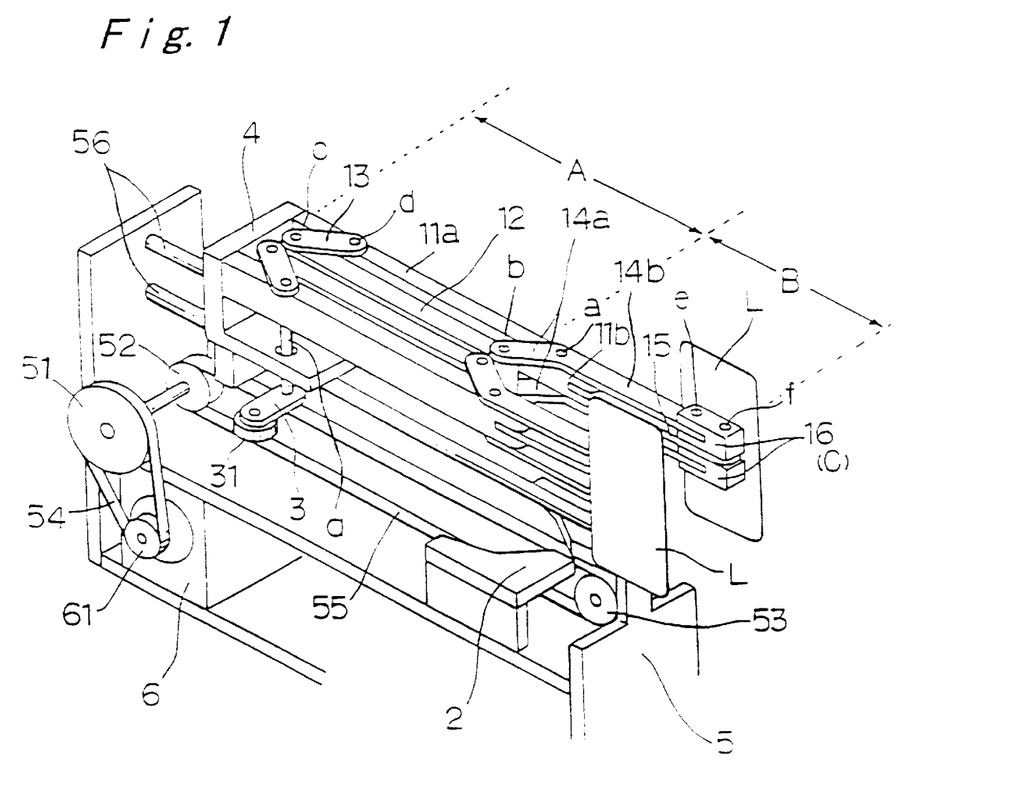
FIG. 1 is a perspective view of one embodiment of an in-mold label applying device according to the present invention, showing one state of the entering arms before entry between each metal mold half.

One embodiment of an in-mold label applying device according to the present invention will be described hereinafter with reference to the drawings. FIG. 1 is a perspective view showing a before-entry state of entering arms according to this embodiment, and FIG. 2 is a perspective view showing an after-entry state of entering arms according to this embodiment.

An in-mold label applying device according to this embodiment shown in FIG. 1 is adapted to apply a label L to the interior of a metal mold M for blow molding, as seen in FIG. 2 comprising an entering arm A composed of a first link portion formed in a variable configuration, an applying arm B composed of a second link portion formed in a variable configuration and having a shaft a in common with the entering arm A on a distal end thereof, and a label fitting portion C provided on a distal end of the applying arm B, wherein the entering arm A advances toward the metal mold M while varying in configuration. The applying arm B varies in configuration and this operatively associated with the configurational variation of the entering arm A. Because the configuration of the applying arm B varies, the applying arm B causes the label fitting portion C to move to a prescribed position within the metal mold M.

Also, an in-mold label applying device according to this embodiment further comprises a cam plate portion 2 arranged by the side of the entering arm A. As seen in FIG. 2, a cam abutting portion 3 is joined to the entering arm A through a cam shaft d in such a manner as to have a constant angle with one side piece 13 of the entering arm A, the entering arm A effecting, while varying in configuration, an entry due to contact between the cam plate 2 and the cam abutting portion 3. A cam profile of the cam plate 2 is designed such that the label fitting portion C is moved in a direction perpendicular to the advance direction of the entering arm A through the applying arm B.

The in-mold label applying device according to this embodiment will be described hereinafter in more detail. It should be noted that, in an in-mold label applying device according to this embodiment, two sets of the entering arms A and the applying arms B are arranged symmetrically along the advance direction of the entering arms A, so that the label L can be applied to each opened half of the metal mold M. Hereinafter, only one of the two sets of the entering arms A and the applying arms B, and the like are described because the symmetrically arranged remaining arms A or B are the same in construction as those to be described.

As shown in FIGS. 1 and 2, the entering arm A is composed of a first link portion which includes one pair of link members 11a, 12 arranged in parallel, another pair of link members 13, 14a arranged in parallel, and shafts a, b, c, d for joining end portions of the link members 11a, 12, 13, 14a together. The distance between the shafts a and b is equal to the distance between the shafts d and c. The distance between the shafts a and d is equal to the distance between the shafts b and c. A rear end portion of the link member 11a is firmly joined to a slide member 4 as later described, and a distal end portion thereof is integrally formed with a link member 11b which constitutes a second link portion. Here, the link members 11a and 11b are designed so as to maintain a constant angle even when the entering arm A and the applying arm B are varying in configuration.

The link members 13 and 14a are one pair of plate-like members attached to end portions of the link members 11a and 12 in a vertically sandwiched state. On the side of a distal end portion of the link member 14a, a link member 14b constituting the second link member is integrally formed. Here, the link members 14a and 14b are designed in such a manner as to maintain a constant angle between them even when the entering arm A and the applying arm B are varying in configuration. The entering arm A comprising the first link portion is designed so as to vary its parallelogrammic configuration while maintaining the parallel relationship between the pair of link members 11a and 12 and between the pair of link members 13 and 14a.

The applying arm B is constructed in a similar manner as the entering arm A. As shown in FIGS. 1 and 2. The applying arm B comprises a second link portion comprising one pair of link members 11b and 16 arranged in parallel relation to each other, another one pair of link members 14b and 15 arranged in parallel relation to each other, and shafts a, e, f and g for joining end portions of those link members together. In case of this embodiment, before entry of the entering arm A, the shafts a, e, f and g are in alignment, the distance between the shafts a and g is equal to the distance between the shafts e and f, and the distance between the shafts a and e is equal to the distance between the shafts g and fi The label fitting portion C preliminarily applied with the label L is mounted on the link member 16.

The link members 14b are one pair of plate-like members attached to end portions of the link members 11a in a vertically sandwiching state along the shaft common with the first link. On the side of a rear end portion of the link member 14b, a link member 14a constituting the first link member is integrally provided. The link member 15 is a single plate-like member attached to the thick-wise center of the distal end of the link member 11b along the shaft g. The applying arm B comprising the second link portion is designed so as to vary its parallelogrammic configuration while maintaining the parallel relationship between the one pair of link members 11b and 16 and between the other pair of link members 14b and 15.

The slide member 4, to which the rear end portion of the link member 11a is joined, is slidably disposed on a base portion 5 of the in-mold label applying device slide-able able along a pair of poles 56. A pair of holes are formed in a horizontal surface of the slide member 4. The shafts d extend downward to pierce through the holes, respectively. The cam abutting portion 3 is joined to a lower end of each shaft d. The cam abutting portion 3 is joined through the (cam shaft) d in such a manner as to have a constant angle with the link member (one side piece) 13. The cam abutting portion 3 is rotatably provided on a distal end thereof with a roller 31 so that a smooth contact can be performed with the cam plate 2. The cam abutting portion 3 or the entering arm portion A is constantly biased by a spring or the like such that the abutting portion 3 or the entering arm portion A is caused to return to an initial state or configuration thereof.

The base portion 5 is provided with a servo motor 6 served as a drive source for an advance action of the entering arm A and a moving action for the applying arm B associated with the advance of the entering arm A. The base portion 5 is further provided with pulleys 52 and 53 and a belt 55 adapted to slide the slide member 4. The slide member 4 is connected to the belt 55. The pulley 52 is connected to another pulley 51, which is arranged in parallel relation thereto, along a rotational shaft. The pulley 51 is operatively connected to a pulley 61 of the servo motor 6 through a belt 54.

The cam plate 2 is provided by the side of the entering arm A on the distal end side of the base portion 5. The cam plate 2 is located at the same level of height as the cam abutting portion 3. That portion of the cam plate 2, which contacts the cam abutting portion 3, has a curved configuration. A cam profile (contour of the curved portion) of the cam plate 2 is designed such that it comes into contact with the cam abutting portion 3 in accordance with the advance of the entering arm A and causes the shaft d to rotate, causing in turn the entering arm A and the applying arm B to deform and the label fitting portion C on the distal end of the applying arm B to move in a direction perpendicular to the direction of movement of the entering arm A.

Figure 3:
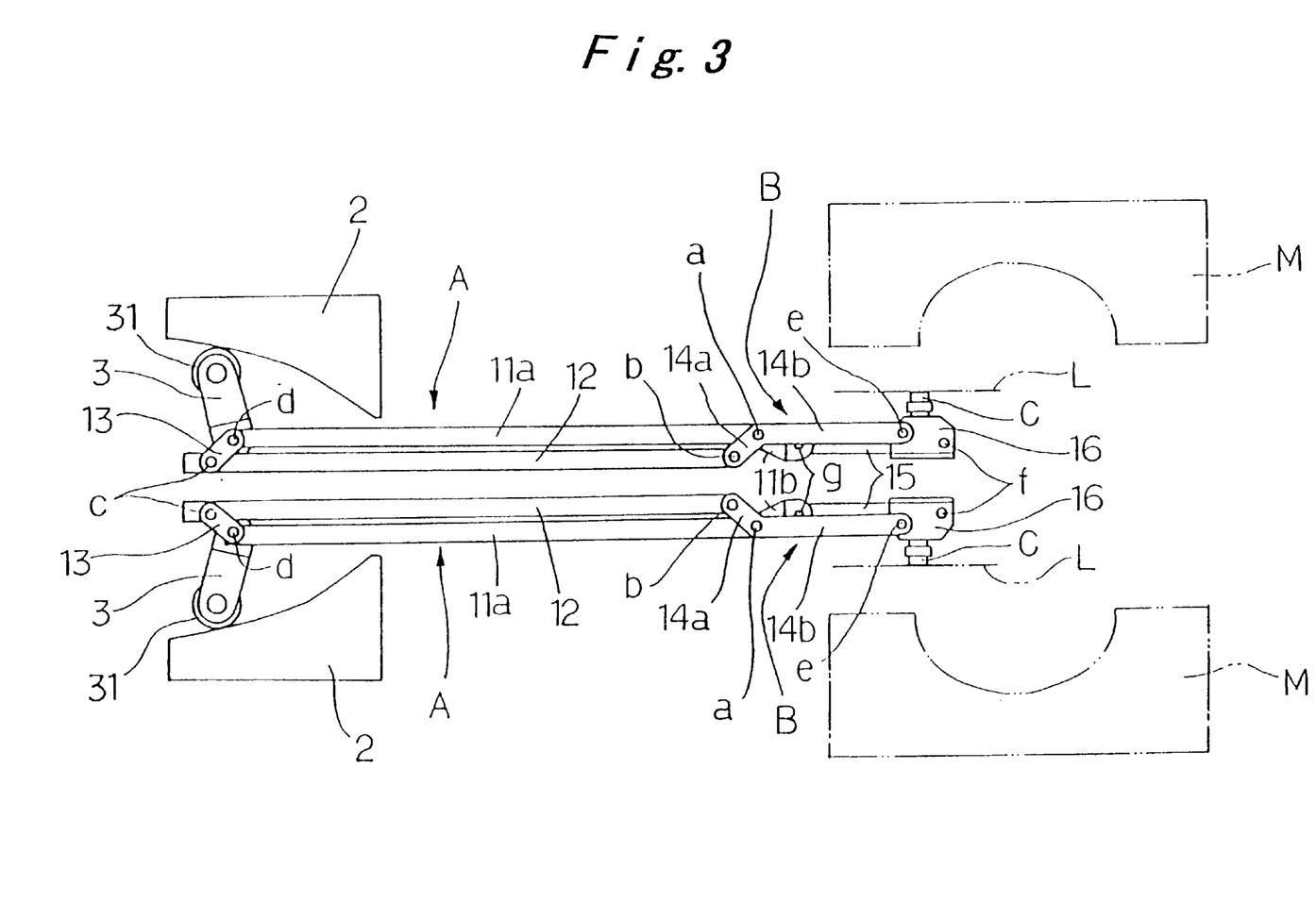
FIG. 3 is a plan view of another embodiment of an in-mold label applying device according to the present invention, showing one state of the cam plate and the cam abutting portion immediately after being contacted with each other.
Figure 4:
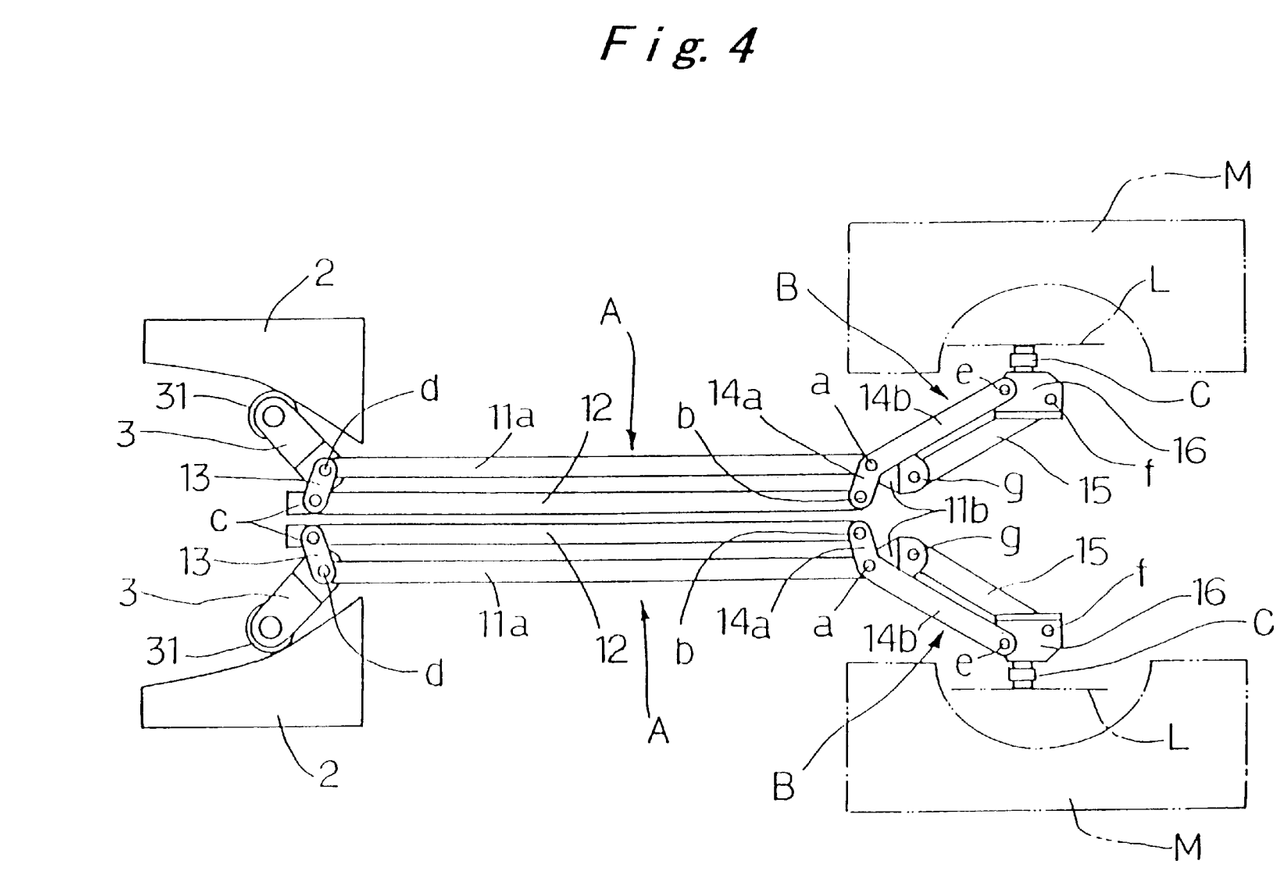
FIG. 4 is a plan view of the above-mentioned second embodiment of an in-mold label applying device according to the present invention, showing one state of the applying arms during movement.
Figure 5:
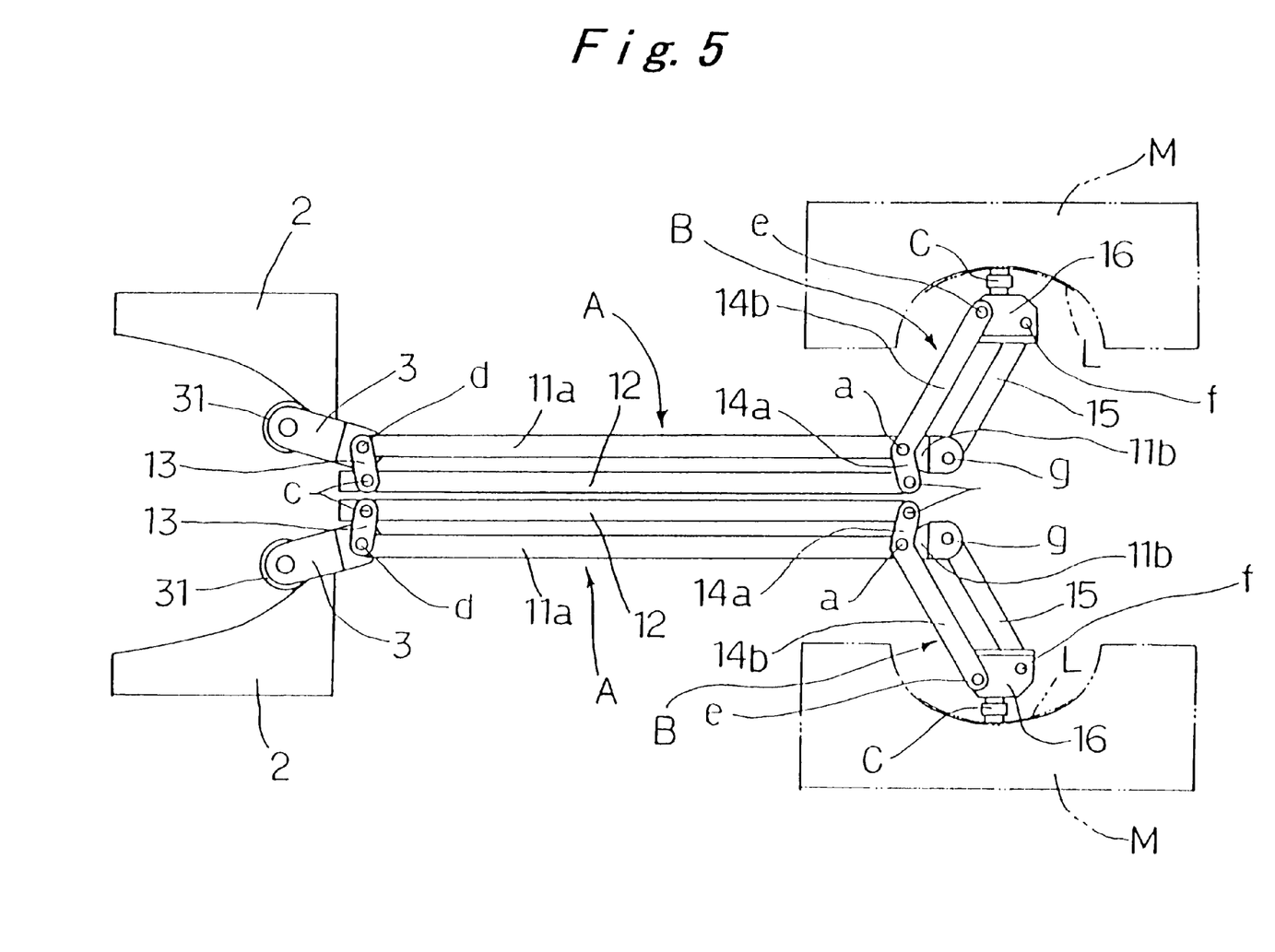
FIG. 5 is a plan view of the above-mentioned second embodiment of an in-mold label applying device according to the present invention, showing one state of the label immediately after application thereof.

FIGS. 3 through 5 show another embodiment of the present invention. A construction of the embodiment shown in FIGS. 3 through 5 is exactly the same as that of the embodiment shown in FIGS. 1 and 2, except that the configuration of the applying arm B comprising the second link is different from that of the embodiment of FIGS. 1 and 2. Only the applying arm B is described hereinafter. Identical component parts to those of FIGS. 1 and 2 are denoted by identical reference numerals and description thereof is omitted.

In the applying arm B of this embodiment, the shafts a, e, f and g are not in alignment and. The applying arm B exhibits a parallelogrammic configuration with the shafts a, e, f and g each serving as an apex. The distance between the shafts a and g is equal to the distance between the shafts e and f. The distance between the shafts a and e is equal to the distance between the shafts g and f. In FIGS. 3 through 5, the slide member, the base portion the servo motor, and the like are omitted.

Figure 6:
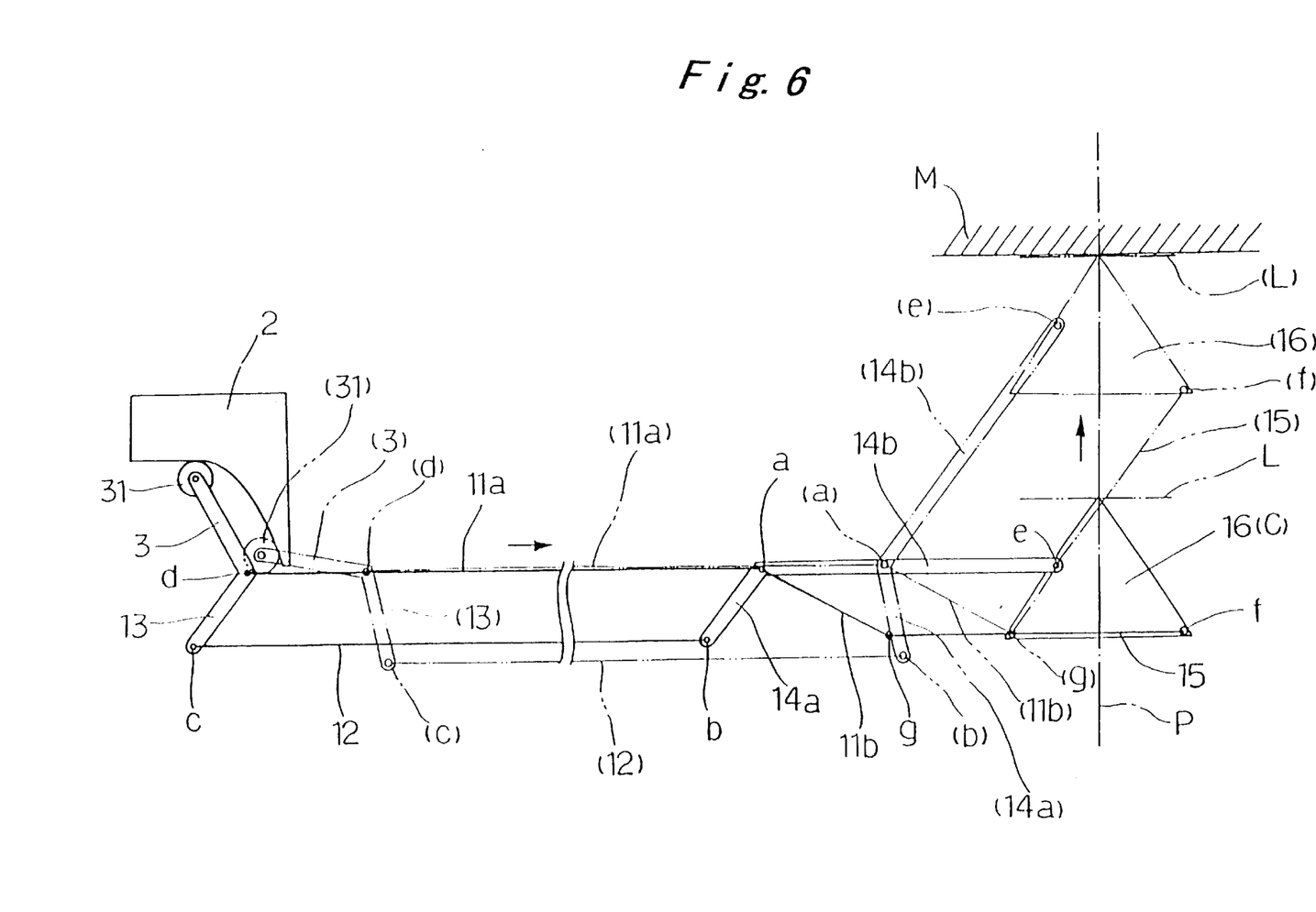
FIG. 6 is a schematic plan view of the above-mentioned second embodiment of an in-mold label applying device according to the present invention, showing an operation thereof.

The steps for applying the label L to the metal mold M using the in-mold label applying device according to the embodiment of FIGS. 3 through 5 are described with reference to FIG. 6. FIG. 6 more correctly schematically illustrates the positional correlation among the applying arm B, the cam plate 2, the cam abutting portion 3, the label L and the metal mold M. In FIG. 6, the solid line shows a state immediately after the curved portion of the cam plate 2 contacts the cam abutting portion 3, while the broken line shows a state immediately after the label L is applied to the inner surface of the metal mold M.

The steps using the in-mold label applying device of FIGS. 3 through 5 are described hereinafter. It should be noted, however, that the embodiment of FIGS. 3 through 5 is merely different in the configuration of the applying arm B from the embodiment of FIGS. 1 and 2 as previously described and therefore, the steps to be described are completely applicable to the embodiment of FIGS. 1 and 2. With respect to those component parts which are not shown in FIG. 6, reference should be made to the description with respect to the embodiment of FIGS. 1 and 2.

The operation of the in-mold label applying device, in the whole operation of the blow-molding machine for a blow molded container, is supervised and controlled by a computer or the like. Therefore, during the time after a molded container is removed from an opened metal mold M to the time the metal mold M is closed again, the procedure for applying the label L to the inner surface of the metal mold M as hereinafter described is finished. First, as a label stock, not shown, the label L to be applied is attached to the label fitting portion C. The label L is attached to the label fitting portion C by absorption or the like using a suction cup and an electric charge.

Subsequently, as shown in FIG. 2 when the metal mold M is in its open position, the servo motor 6 is driven to cause the pulley 61 to rotate clockwise in the drawings. The rotation of the pulley 61 is transmitted to the pulley 52 through the belt 54 and the pulley 51. When the pulley 52 rotates, the belt 55 strained between the pulleys 52 and 53 is driven. As a consequence, the slide member 4 connected to the belt 55 is caused to slide.

The slide member 4 is slid while guided by the poles 56 and 56, and the entering arm A and the applying arm B connected to the slide member 4 are advanced so as to cause the distal end of the applying arm B to enter the space between the opened metal mold M. When the label fitting portion C provided on the distal end of the applying arm B comes in front of the part on the inner surface of the metal mold M where the label L is to be applied, the curved portion of the cam plate 2 and the roller 31 of the cam abutting portion 3 are contacted by each other (see also the solid line portion of FIG. 6).

The entering arm in FIG. 2 is caused to enter further therein. In accordance with the advance of the entering arm A, the shaft d connected to the cam abutting portion 3 rotates and the link member 13 rotates about the shaft d. The entering arm A is varied in configuration thereof as the link member 13 rotates about the shaft d. At that time, however, the link members 11a and 12 and the link members 13 and 14a are maintained in their parallel relationship.

Since the link members 11b and 14b of the applying arm B are integrally formed with the link members 11a and 14a respectively while maintaining a constant angle with the link members 11a and 14a of the entering arm A, the applying arm B is varied in configuration thereof and is operatively associated with the deformation of the entering arm A. It should be noted, however, that the link members 11b and 16 and the link portions 14b and 15 are maintained in their parallel relationship and the label fitting portion C provided on the link member 16 moves along the broken line P of FIG. 6. This broken line P is a straight line perpendicular to the advance direction of the entering arm A.

Then, the label L attached to the label fitting portion C is brought towards the inner surface of the metal mold M from the vertical direction and applied thereto (see the broken line portion of FIG. 6). The label L is applied to the inner surface of the metal mold M by absorption or the like using a suction cup, and an electric charge. By setting the suction force or absorption force on the side of the metal mold M larger than the suction force or absorption force on the side of the label fitting portion C, or by cutting off the suction force or drawing force of the label fitting portion C when the label L contacts the inner surface of the metal mold M, the label L is applied to the inner surface side of the metal mold M from the label fitting portion C.

The entering arm A is controlled so as to stop when the label L is applied to the inner surface of the metal mold M. Thereafter, the servo motor 6 rotates in reverse to retract the entering arm A. In accordance with the retraction of the entering arm A, the entering arm A and the applying arm B are returned to their initial states by a restoring force applied to the cam abutting portion 3 or the entering arm A.

When the entering arm A is returned to its initial position, the configurations of the entering arm A and the applying arm B are also returned to their initial configurations, respectively. Then, the label L to be attached to the next container is attached to the label fitting portion C. In parallel with the retraction of the entering arm A, the metal mold M is closed with a part sandwiched therebetween, blown and cooled. A blow molded container thus formed is in a finished state with the label L intimately and integrally applied to the surface thereof.

The in-mold label applying device according to the above embodiment is constructed in the manner as mentioned above. According to the in-mold label applying device of to the above embodiments (i.e. the embodiment of FIGS. 1 and 2 and the embodiment of FIGS. 3 through 5), the device can be simplified in structure and reduced in weight. Moreover, since the applying arm B is moved and operatively associated with the advance action of the entering arm A, it is no more required to make sure that the previous operation is completed and therefore, no time loss occurs. As a consequence, the molding cycle time (time required for molding one piece of a container) can be shortened.

Furthermore, according to the in-mold label applying apparatus according to the above embodiments (embodiment of FIGS. 1 and 2 and embodiment of FIGS. 3 through 5), the label fitting portion C moves in a direction vertical to the inner surface of the metal mold M to apply the label L thereto. Accordingly, a correct applying position can be selected. Moreover, any damage caused by rubbing of the label L can be prevented. As a consequence, there can be obtained a container having the label L integrally attached thereto at its correct position. Thus, the molding quality can be enhanced.

An in-mold label applying device according to the present invention is not limited to the above-mentioned embodiments. For example, in the above embodiments, although the label L is applied to the interior of each opened mold half of the metal mold M, the label L may be applied to the inner surface of only one of the metal mold M halves. Other modifications can appropriately be made without departing, from the scope of the present invention.

Industrial Applicability

According to the invention as defined in the accompanying claims, the label is applied to the inner surface of the mold by the label fitting portion provided on a distal end of the applying arm which can be varied in configuration and operatively associated with the deformation of the entering arm. Since the label can be applied through deformation of the applying arm only if there is a provision of a drive source for deforming the entering arm, there can be obtained an in-mold label applying device in which the overall structure can be simplified, costs can be reduced, and a failure hardly occurs. Since the applying arm itself is not required to be mounted thereon with a drive source for moving the same or the like, it can be designed as compact and light-weight. As a consequence, the opening amount of the mold can be reduced and the arm portion can follow a high-speed operation. Thus, a larger number of containers can be labeled in a short period of time.

In addition to the above-mentioned effects of the invention the entering arm is deformed in association with the entering action of the entering arm. Accordingly, a provision of a single drive source for performing the advance action of the entering arm is sufficient enough to perform the operation of the overall device. For this reason, the mechanism can be so simplified by providing as only a provision of the cam plate and the cam abutting portion. As a consequence, costs can be reduced and frequency of a failure can be reduced. Moreover, the device of the present invention can contribute to the requirement for high-speed operation.

In addition to the effects of the present invention the label can be prevented from getting damaged due to rubbing by the mold because the label fitting portion is moved in a direction vertical to the inner surface of the mold so as to apply the label thereto. Moreover, even if the surface to be attached with the label is curved, the label can be attached at a correct position. In addition, even if the configuration of the container to be molded, namely, the configuration of the metal mold, is changed, there is almost no influence of configuration change of the metal mold or no need for changing the label fitting portion, because the label applying direction is vertical to the mold.

I claim:

1. An in-mold label applying device for applying a label to an interior of a metal mold for blow molding, comprising:

an entering arm having a first link portion with a changeable configuration, an applying arm having a second link portion with a changeable configuration and also having a shaft in common with said entering arm on a distal end thereof, and a label fitting portion provided on a distal end of said applying arm, wherein, when said entering arm advances toward said metal mold while changing in configuration, said applying arm also changes in configuration and is operatively associated with the changeable configuration of said entering arm, wherein, when the configuration of said applying arm changes, said applying arm causes said label fitting portion to move to a prescribed position within said metal mold, wherein said first link portion includes one pair of link members arranged in parallel, and wherein said entering arm has another pair of link members arranged in parallel and also has shafts for joining end portions of said link members together.

2. An in-mold label applying device for applying a label to an interior of a metal mold for blow molding, comprising:

an entering arm having a first link portion with a changeable configuration, an applying arm having a second link portion with a changeable configuration and also having a shaft in common with said entering arm on a distal end thereof, and a label fitting portion provided on a distal end of said applying arm, a cam plate portion arranged by a side of said entering arm, and a cam abutting portion connected to said entering arm through a cam shaft in such a manner as to have a constant angle with one side piece of said entering arm, said entering arm making, while changing in configuration, an entry into said metal mold due to contact between said cam plate and said cam abutting portion, wherein, when said entering arm advances toward said metal mold while changing in configuration, said applying arm also changes configuration and is operatively associated with the changeable configuration of said entering arm, and wherein, when the configuration of said applying arm changes, said applying arm causes said label fitting portion to move to a prescribed position within said metal mold.

3. The in-mold label applying device according to claim 2, wherein a cam profile of said cam plate is designed such that said label fitting portion is moved in a direction perpendicular to the advance direction of said entering arm through said applying arm.

4. The in-mold label applying device according to claim 1, wherein two sets of said entering arms and said applying arms are arranged symmetrically along the advance direction of said entering arms, so that the label can be applied to each opened half of said metal mold.

* * * * *